(12) United States Patent
Liu et al.

(10) Patent No.: US 10,891,178 B2
(45) Date of Patent: Jan. 12, 2021

(54) METHOD AND DEVICE FOR IDENTIFYING PROBLEMATIC COMPONENT IN STORAGE SYSTEM

(71) Applicant: EMC IP Holding Company LLC, Hopkinton, MA (US)

(72) Inventors: Bing Liu, Tianjin (CN); Man Lv, Beijing (CN); Fang You, Wuhan (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 151 days.

(21) Appl. No.: 16/167,845

(22) Filed: Oct. 23, 2018

(65) Prior Publication Data

US 2019/0129785 A1 May 2, 2019

(51) Int. Cl.
| *G06F 11/00* | (2006.01) |
| *G06F 11/07* | (2006.01) |
| *H04L 29/08* | (2006.01) |
| *H04L 12/24* | (2006.01) |
| *G06F 13/40* | (2006.01) |

(52) U.S. Cl.
CPC ........ *G06F 11/0751* (2013.01); *G06F 11/079* (2013.01); *G06F 11/0727* (2013.01); *G06F 11/0775* (2013.01); *G06F 13/4022* (2013.01); *H04L 41/069* (2013.01); *H04L 41/0677* (2013.01); *H04L 41/12* (2013.01); *H04L 67/1097* (2013.01)

(58) Field of Classification Search
CPC .................................................. G06F 11/321
See application file for complete search history.

(56) References Cited

U.S. PATENT DOCUMENTS

| 2005/0099419 A1* | 5/2005 | Castonguay | ........ H04L 41/0631 345/420 |
| 2015/0033084 A1* | 1/2015 | Sasturkar | .......... G06F 16/24578 714/46 |
| 2015/0280968 A1* | 10/2015 | Gates | ...................... G06F 11/30 714/37 |
| 2017/0279687 A1* | 9/2017 | Muntes-Mulero | .... H04L 41/065 |

OTHER PUBLICATIONS

NPL: Google Scholar/Patents—see attached (Year: 2020).*

* cited by examiner

*Primary Examiner* — Christopher S McCarthy
(74) *Attorney, Agent, or Firm* — Krishnendu Gupta; Peter Jovanovic (57) ABSTRACT

Embodiments of the present disclosure relate to a method and device for identifying a problematic component in a storage system. The method comprises determining, based on history error logs of components of the storage system, a graph indicating error information of the components, where nodes in the graph indicate the components, and edges in the graph indicate connections between the components; the method further comprises identifying, based on the graph, an error source in the components of the storage system to be the problematic component. With the method and device of the present disclosure, the error source in the storage system can be identified more accurately and effectively and user experience can be enhanced.

16 Claims, 9 Drawing Sheets

METHOD AND DEVICE FOR IDENTIFYING PROBLEMATIC COMPONENT IN STORAGE SYSTEM

RELATED APPLICATIONS

This application claim priority from Chinese Patent Application Number CN 201711025418.8, filed on Oct. 27, 2017 at the State Intellectual Property Office, China, titled "METHOD AND DEVICE FOR IDENTIFYING PROBLEMATIC COMPONENTS IN STORAGE SYSTEM" the contents of which is herein incorporated by reference in its entirety.

FIELD

Embodiments of the present disclosure generally relate to a storage system, and more specifically, to a method and device for identifying a problematic component in a storage system.

BACKGROUND

To meet the increasingly higher demand for data storage capacity, read and write speeds, data security and so on, the current enterprise-level storage system usually has a more complex topology structure and components than traditional products. For example, a model of a high-end data domain product can support as many as 56 data array enclosures (DAEs) each of which may support 15 disk drives. The 56 DAEs may be located on eight different chains, each chain having 7 DAEs in depth. In such a data storage system, there are many relay devices, such as an expander, for performing functions like data exchange or routing; moreover, the data storage system also has a large number of connection components, for instance, cables for connecting these devices.

A storage system having so many components is prone to errors. These errors may be caused by storage devices, relay devices or cables inside the system. In some cases, when an individual component has failure, it is likely to affect directly or indirectly other components associated therewith. This "chain effect" will cause other components that do not have failure to be influenced, which makes it difficult for the maintenance staff to locate, identify and process such errors upon occurrence of the errors in the storage system.

Therefore, upon occurrence of an error in the storage system, how to identify the source of the error more effectively or accurately so as to provide it as a problematic component in the storage system to the user remains a challenge.

SUMMARY

Embodiments of the present disclosure provide a method and device for identifying a problematic component in a storage system.

In accordance with a first aspect of the present disclosure, there is provided a method for identifying a problematic component in a storage system, the method comprising: determining, based on history error logs of components of the storage system, a graph indicating error information of the components, nodes in the graph indicating the components, and edges in the graph indicating connections between the components; and identifying, based on the graph, an error source in the components of the storage system to be the problematic component.

In accordance with a second aspect of the present disclosure, there is provided a device for identifying a problematic component in a storage system, comprising at least one processing unit; and at least one memory coupled to the at least one processing unit and storing instructions executed by the at least one processing unit, the instructions, when executed by the at least one processing unit, causing the device to perform acts comprising: determining, based on history error logs of components of the storage system, a graph indicating error information of the components, nodes in the graph indicating the components, and edges in the graph indicating connections between the components; and identifying, based on the graph, an error source in the components of the storage system to be the problematic component.

In accordance with a third aspect of the present disclosure, there is provided a computer program product tangibly stored on a non-transient computer readable medium and comprising machine executable instructions, the instructions, when executed, cause a machine to perform any step of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In example embodiments of the present disclosure, the same reference signs usually represent the same components.

DETAILED DESCRIPTION OF EMBODIMENTS

Preferred embodiments of the present disclosure will be described in the following in greater detail with reference to the drawings. Although the preferred embodiments of the present disclosure are displayed in the drawings, it is to be understood that the present disclosure may be implemented in various manners, and should not be limited to the embodiments illustrated herein. On the contrary, these embodiments are provided to make the present disclosure more thorough and complete and fully convey the scope of the present disclosure to those skilled in the art.

As used herein, the term "include" and its variants are to be read as open-ended terms that mean "include, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The term "another embodiment" is to be read as "at least one further embodiment." The terms "first" and "second" can represent different or same objects. The following text may also include other explicit and implicit definitions.

The term "error" as used herein may be used interchangeably with "problem" and "failure."

As stated above, an enterprise-level storage system for commercial purpose generally has a large storage capacity and a complex topology structure. Such a complex system is often error-prone. Currently, for such a large-scale hardware system, there does not exist a systematic solution for effectively identifying the error source therein. Generally, after the system fails, the system maintenance staff adopts a trial and error method to locate the problematic component, replace the possibly failed components one by one, and determine whether the storage system is recovered. During this process, the maintenance staff has to spend a long time to check the error log repeatedly, try to extract information useful for locating the error source therefrom based on their expertise and knowledge about the system, and look for the possibly failed components.

The above existing solution has the following disadvantages:

Error-prone: The system maintenance staff mainly relies on personal experience to identify the failed components. This approach is obviously too subjective and susceptible to other factors.

Cross-team complexity: In order to locate the errors, it is necessary to obtain knowledge about the internal composite structure of the system. The maintenance staff might need the assistance from the system developers, thereby increasing the complexity of the work.

Unnecessary costs: The maintenance staff identifies the errors manually and discusses with the developers, which will consume a lot of time and effort and incur more costs for the enterprise.

User dissatisfaction: As the complexity of the system increases, the time and effort required to locate the problematic component and repair the system will also increase, which often seriously affects the user experience. In the long run, the user may be inclined to seek other system providers.

To at least partly solve the above and other potential problems, embodiments of the present disclosure provide a scheme for identifying a problematic component in a storage system. The scheme abstracts the topology structure of the storage system as a graph indicating error information of components therein and processes the graph, thereby identifying the possibly problematic component in the graph. The scheme for identifying the problematic component in accordance with embodiments of the present disclosure will be described below in greater detail with reference to FIGS. 1-9.

Figure 1:
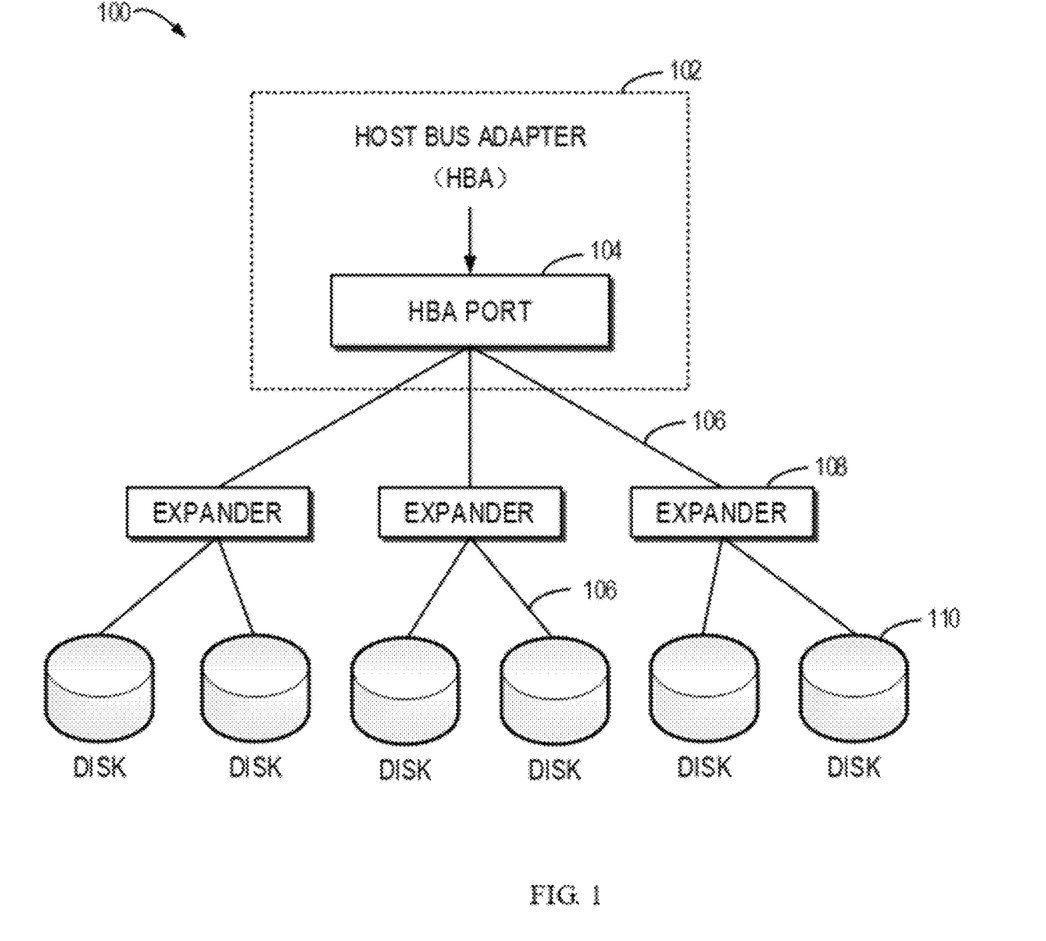
FIG. 1 illustrates a schematic diagram of an example storage system in accordance with embodiments of the present disclosure.

FIG. 1 is a schematic diagram illustrating an example storage system in accordance with embodiments of the present disclosure. It is to be understood that, for the ease of depiction and illustration, the internal structure of the storage system 100 in FIG. 1 is simplified. In the following, its structure and function are depicted only for illustrative purpose, without suggest any limitation to the scope of the present disclosure. Embodiments of the present disclosure may be embodied in other structures and/or functions, or in a system having different degrees of complexity.

The storage system 100 may include a plurality of components, such as identical or different types of devices, units, apparatuses, connections and the like. As shown in FIG. 1, the storage system 100 includes a host bus adapter (HBA) 102 which may be in the form of an interface card and inserted into an appropriate bus slot. The host bus adapter has a plurality of ports 104 (only one is shown in the figure) for connecting a plurality of relay devices (such as an expander 108). The expander 108 may have a function similar to data exchange or routing to control the flow direction of the accessed data. Each expander can further be connected to a plurality of disk drive devices (abbreviated as "disk") 110. Besides, the storage system 100 further has one or more cables 106 for connecting the above devices in the storage system. Cables 106, for instance, may include: a data cable, a power line and the like. It is to be understood that the number of various components shown in FIG. 1 is illustrative, for example, the expander may connect any number of disks, rather than two. It is to be understood that the specific components contained in the storage system shown in FIG. 1 are illustrative, rather than limiting.

Figure 2:
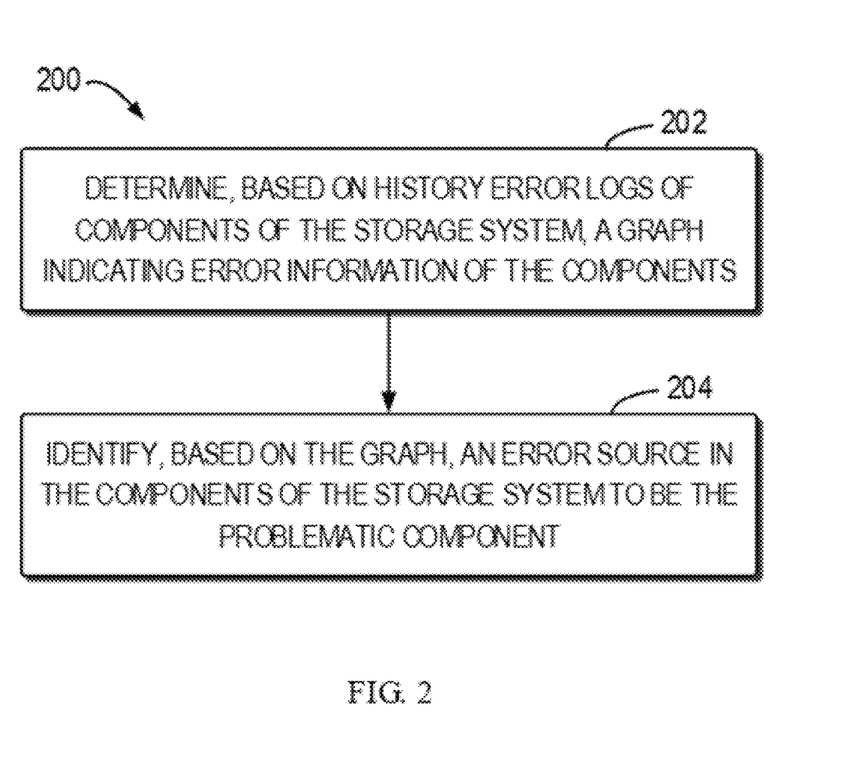
FIG. 2 illustrates a flowchart of a method for identifying a problematic component in a storage system in accordance with embodiments of the present disclosure.

FIG. 2 is a flowchart illustrating a method 200 for identifying a problematic component in a storage system in accordance with embodiments of the present disclosure. It is to be understood that the problematic component identified by method 200 does not only include composite devices in the storage system 100, but also include connecting cables in the storage device 100. It is to be understood that apart from the blocks shown, the method 200 may include additional blocks which are not shown and/or omit the shown blocks. The scope of the present disclosure is not limited in this regard.

The method 200 starts at block 202 at which a graph indicating error information of components of the storage system (hereinafter also referred to as "error information graph") is determined based on history error logs of the components. In accordance with embodiments of the present disclosure, the error information graph may be determined in various ways. In some embodiments, it is possible to determine the topology structure and history error log of each component of the storage system 100 from the original log of the storage system 100. Then, the structure graph of the storage system may be built based on topology structure. Subsequently, it is possible to apply the history error log to the structure graph, thereby obtaining the error information graph.

The structure graph of the storage system is a mathematic abstraction of the actual physical structure of the storage system and may be constructed in various manners. In some embodiments, the structure graph of the storage system 100 may be constructed based on a hardware topology structure of the storage system shown in FIG. 1. The structure graph, for instance, may be represented by a directed acyclic graph (DAG). The directed acyclic graph may be defined as follows: If a directed graph cannot start from any one vertex and return to this vertex through several edges, then the graph is a directed acyclic graph (abbreviated as "DAG").

When mapping from the topology structure to the structure graph is built, each node in the structure graph represents a field-replaceable unit (FRU) in the storage system 100. It is to be understood that the failed object in the storage system 100 can be both the storage device (such as the disk 110), the relay device (such as the expander 108), and the large amount of connecting components (such as the cable 106) connecting these devices. The cable 106 may be in the specific form of a data cable or a power line. It is to be understood that the specific form of the cable 106 is only illustrative, rather than limiting, and embodiments of the present disclosure are not limited in this regard. Therefore, when the structure graph of the storage system 100 shown in FIG. 1 is constructed, the cable 106 is considered as nodes equivalent to the storage device or relay device. In other words, nodes in the structure graph denote various components (including devices and cables between the devices) in the storage system.

The edges in the structure graph represent connections between the FRUs. As the structure graph is a directed acyclic graph, the edges between the nodes are directed and each edge represents a directed connection from one FRU node to another FRU node.

Figure 3:
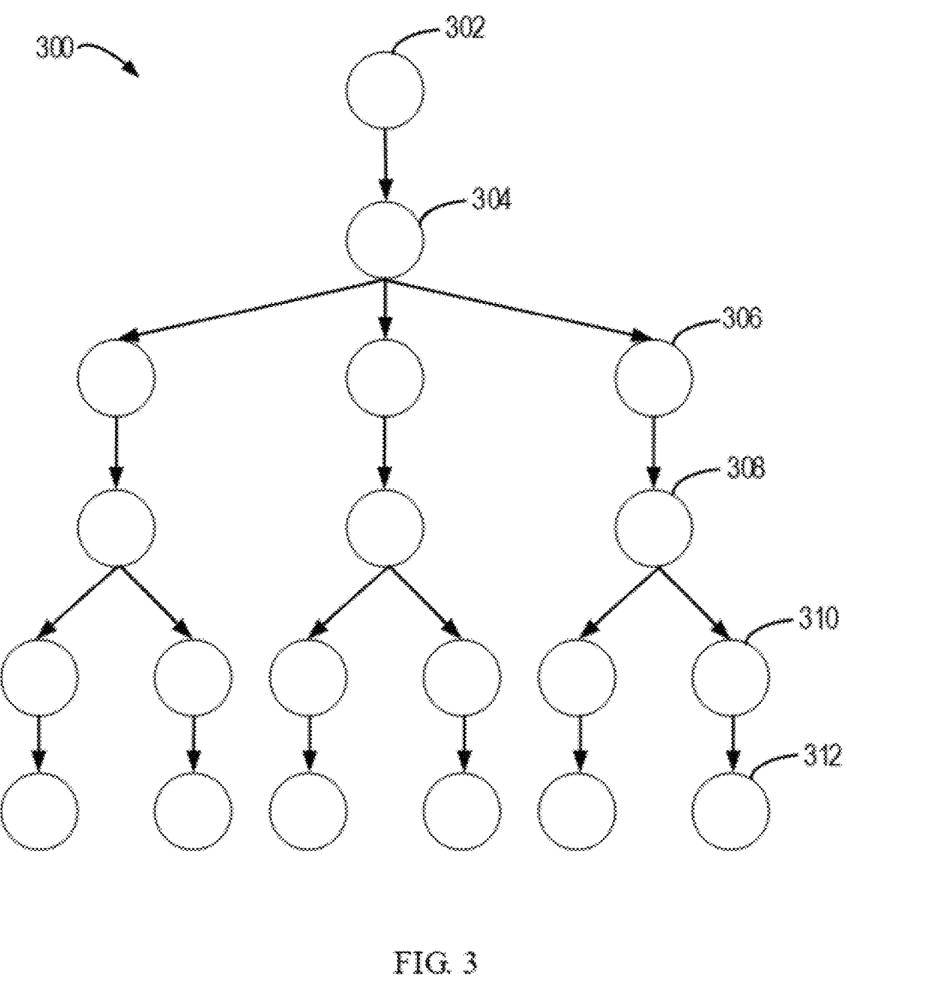
FIG. 3 illustrates a schematic diagram of a graph of a topology structure of an example storage system in accordance with embodiments of the present disclosure.

FIG. 3 is a schematic diagram illustrating a structure graph associated with a topology structure of an example storage system in accordance with embodiments of the present disclosure. As can be seen from FIG. 3, the hardware topology structure of the whole storage system 100 is completely mapped to the structure graph 300. The root node 302 corresponds to the host bus adapter (HBA) 102, the node 304 corresponds to one of the plurality of HBA ports, the node 306 corresponds to the connecting cable from the HBA port 104 to the expander 108 shown in FIG. 1, the node 308 corresponds to the expander 108, the node 310 corresponds to the connecting cable from the expander 108 to the disk 110, and the node 312 corresponds to the disk 110. It is to be understood that in FIG. 3, each node corresponds to a single component (such as the device and cable) in the storage system 100 while each edge in the figure corresponds to the connections between the components. It is to be understood that although FIG. 3 only illustrates one root node 302, in other embodiments of the present disclosure, two or more root nodes may exist, and in addition to the host bus adapter 102, the root nodes may also correspond to any other appropriate components. Embodiments of the present disclosure are not limited to the specific examples provided herein.

After the structure graph of the storage system is obtained, it is possible to apply the history error logs into the structure graph to obtain the error information graph. The original log may not only contain topology structure information of the storage system that may be used to construct the structure graph of the storage system, but also the history error logs of the storage system. The history error logs may include the error information associated with the components of the storage system. Therefore, by applying the error information associated with the components to the structure graph containing the connections of these components, a graph indicating the error information of these components may be obtained.

Optionally or additionally, in some embodiments, it is possible to determine whether the error information graph has a topology error, which, for instance, may be performed through a consistency check. In the case of presence of the topology error, the error information graph may be updated based on the topology template. The topology template may be obtained, for instance, based on priori knowledge about the topology structure of the storage system, or in other appropriate ways. With the updated error information graph, it is possible to supplement a plurality of nodes missing in the topology graph, eliminate the originally existing topology error and prepare for the subsequent processing.

Continuing to refer to FIG. 2, at block 204, the error source in the components of the storage system is identified as a problematic component based on the error information graph. It is possible to determine the error information of each component in the storage system 100 from the error information graph, and determine the error source in the components of the error information graph based on the error information. Such error information may be appended to each node in the error information graph.

In some embodiments, such error information may include: a non-contagious error, a contagious error associated with the topology structure, and a contagious error un-associated with the topology structure, and/or other related errors. By classifying the error information, it is possible to distinguish the identified types of the error sources, such that the user can identify different error sources in the storage system 100 quickly and accurately.

The error source may be determined based on the above error information in different ways. In some embodiments, if a certain component in the error information graph has a contagious error associated with the topology structure, the component is identified as an error source associated with the topology structure.

Optionally or additionally, in some embodiments, if some component in the error information graph only has a non-contagious error, then the component is identified as an error source of a non-contagious error type.

Optionally or additionally, in some embodiments, firstly, a plurality of paths from the root node to the node corresponding to the component having a contagious error un-associated with the topology structure in the error information graph are obtained; subsequently, a set of corresponding truncated paths are generated based on the plurality of paths; and a type of error source corresponding to an individual node is determined based on the truncated paths having uniqueness in the set of truncated paths; another type of error source not corresponding to an individual node is determined based on the truncated paths having non-uniqueness in the set of truncated paths.

The error source identified in the above manner indicates that the storage system 100 has a component with a high error occurrence probability. Therefore, when the storage system 100 fails, the error source is identified according to embodiments of the present disclosure so that the maintenance staff can locate the failed component more efficiently and accurately.

Figure 4:
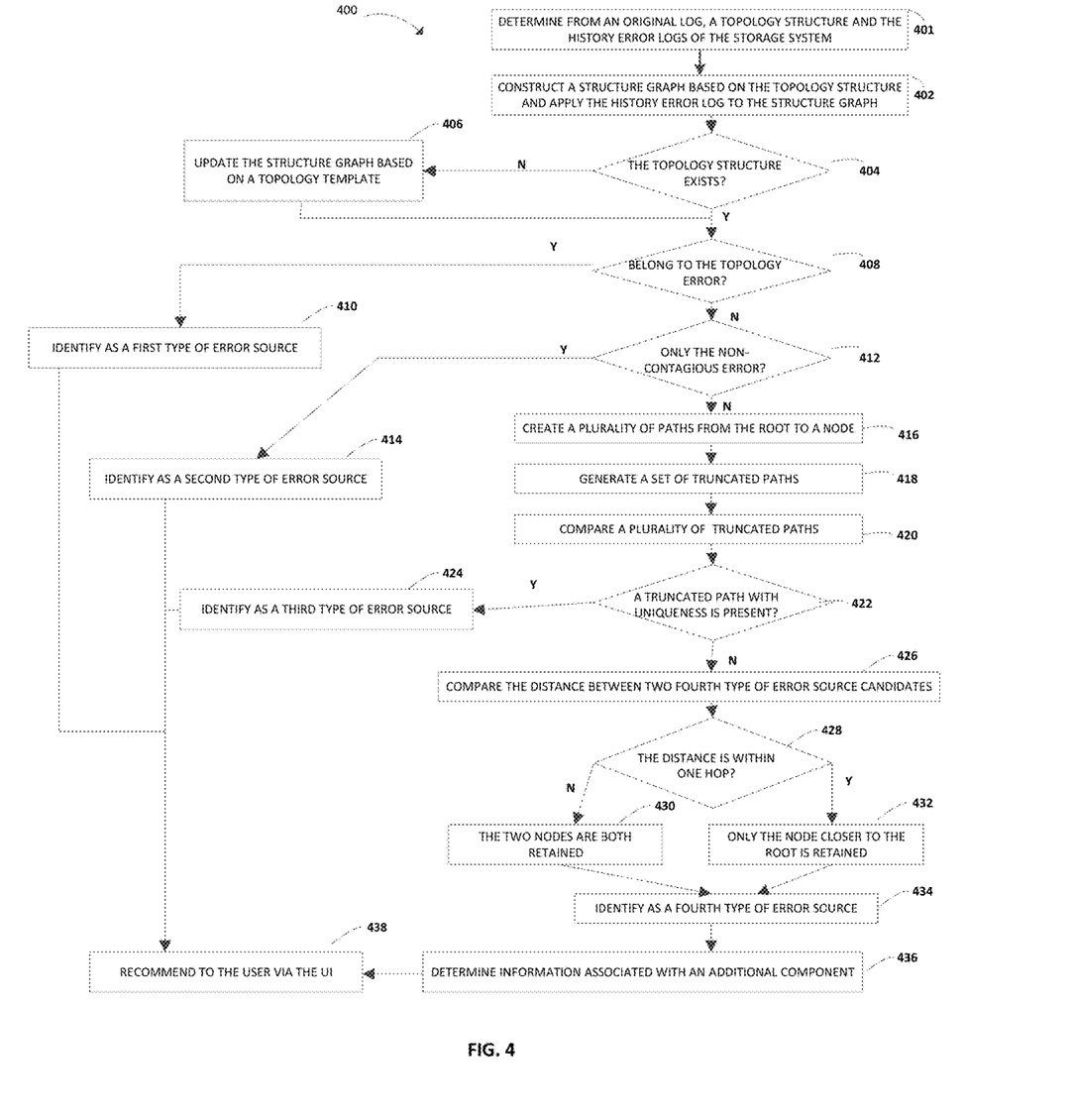
FIG. 4 illustrates a specific flowchart of a method for identifying a problematic component in a storage system in accordance with embodiments of the present disclosure.

A method for identifying a problematic component according to embodiments of the present disclosure will be depicted below in detail with reference to FIG. 4. FIG. 4 is a specific flowchart illustrating a method 400 of identifying a problematic component in a storage system in accordance with embodiments of the present disclosure. It is to be understood that the method 400 shown in FIG. 4 is a specific embodiment of the method 200 shown in FIG. 2, and it is only illustrative rather than limiting.

At block 401, information depicting the topology structure of the whole storage system 100 and history error log information are obtained from the original log. The history error log information records the specific error information of each component in the storage system.

The obtained history error log includes information such as a name of the component, a time of occurrence, an error property, a detailed depiction and so on. The obtained history error log may be classified preliminarily based on the above history error log. For example, the errors may be divided as contagious errors and non-contagious errors based on the property or detailed depiction of errors. A non-contagious error only affects the component itself, for example, a storage device (such as a disk) has a sector error. A contagious error, in addition to affecting the component itself, further affects other components directly or indirectly connected thereto, for instance, a poor cable connection will cause error to a downstream device connected to it. Contagious errors may be further sub-divided into contagious errors associated with the topology structure and contagious errors un-associated with the topology structure.

Optionally, the obtained history error log information may be filtered with a predetermined time segment, and only error logs associated with the latest state of the storage system is retained. Such a filtering operation can reduce the workload of subsequent analysis effectively. History error logs before a long time are almost non-relevant to the current state of the storage system, and thus can be neglected.

At block 402, a structure graph corresponding to the storage system 100 is constructed based on the obtained hardware topology information. Based on the foregoing depiction, it can be known that the nodes in the structure graph indicate the components of the storage system, and the edges in the structure graph indicate the connections between the components of the storage system.

Subsequently, the error information (namely, the classified history error log) is applied to the created structure graph to generate an error information graph. In this step, if the component corresponding to a certain node in the structure graph has error information, then the corresponding error information is appended to the node for following processing. Repeat the above steps until all the error information has been appended to the nodes in the structure graph.

At block 404, it is determined whether the currently generated error information graph has a topology error. This step is accomplished by performing a integrity check to the error information graph. The integrity check can identify an error type that should be paid particular attention to, referred to as a "missing component" error. In an error information graph, such error is embodied by the missing of all the nodes under a particular node. If this type of error occurs at a component corresponding to the particular node, all the components under a lower level of the component will be invisible. This type of error includes, for instance, losing the disk array, losing the disk path and so on. Under this condition, it is impossible to construct a complete topology of the hardware system, and these missing nodes cannot be used or processed during the following processing.

At block 406, in response to determining the presence of the topology structure error, the error information graph is updated based on a topology template. Such problem may be detected and processed based on priori knowledge about the topology structure of the storage system. For example, for a dual-path SAS domain storage system, to provide redundancy, two different symmetric paths are provided to each disk drive. If only a single path is found for any node corresponding to the disk drive in the error information graph, it is considered that there exists an integrity error. When such an error is detected, the user may obtain the topology template based on an expected complete topology structure of the system, and rebuild a complete dual-path graph on this basis. For a particular component causing a "missing component" error, it is still kept in the graph and labeled as "missing component." Through the above process, the generated error information graph through the integrity check will be used for continuous processing of the subsequent algorithm.

At block 408, it is determined whether the error information graph has nodes involving the topology structure error. That is, it is determined whether nodes identified as "missing component" in the foregoing integrity check process exist. This kind of errors is generally a type of contagious error. In response to determining that this particular type of nodes exist, at block 410, this kind of nodes is identified as a first type of error sources, and output to the user interface (UI).

Subsequently, at block 412, it is determined whether the error information graph contains nodes belonging to the non-contagious errors. This kind of non-contagious errors is, for instance, a sector error of a single disk. As can be known from the foregoing depiction, during the process of constructing the error information graph, error information (namely, containing which non-contagious errors/or contagious errors) related to a certain node in the structure graph has been appended to each node in the graph. In particular, it is possible to know which nodes in the error information graph contain both non-contagious errors as well as contagious errors. Similarly, it is also possible to know which nodes only contain non-contagious errors. In response to determining that a certain node only contains non-contagious errors and does not contain contagious errors, at block 414, it is possible to classify these nodes and label them as a second type of error sources which are output to the UI and provided to the user.

After the above two rounds of screening, nodes containing the error information will be subjected to the following specific algorithm for processing. It shall be easily understood that after nodes having non-contagious errors and nodes having topology structure errors are screened out, the existing nodes containing the error information all involve contagious errors un-associated with the topology. The subsequent processing is accomplished based on the algorithm associated with looking for the "Lowest Common Ancestors (LCA)" of the nodes. Based on such LCA algorithm, the problematic components that are most likely to be true error sources are extracted from the plurality of nodes containing contagious error information in the error information graph and are recommended to the user. For the ease of depiction, reference will be made to FIGS. 4-7.

At block 416, for each existing node containing the error information, a plurality of paths from the root node to a node corresponding to the component having a contagious error un-associated with the topology in the error information graph are obtained. It shall be appreciated easily that for the case that multiple roots exist, the path from each root to a plurality of nodes containing the error information is obtained. Subsequently, a list containing these paths is generated, each item in the list corresponding to a path from the root node to each particular node, respectively.

At block 418, for each path in the list, an operation of removing the last node from the path is performed to generate a set of truncated paths corresponding to the plurality of paths. The new path list generated in this manner is referred to as a list of truncated paths. It shall be understood easily that in each truncated path in the list of truncated paths, each node starting from the root node is consistent with the node in the previously generated path, excluding the node located at the end of the previously generated path which contains the contagious error. Then, for a plurality of nodes sharing a Lowest Common Ancestor distanced within one hop that contain the contagious errors, the truncated path from the root node to the LCA node is the same.

Figure 5:
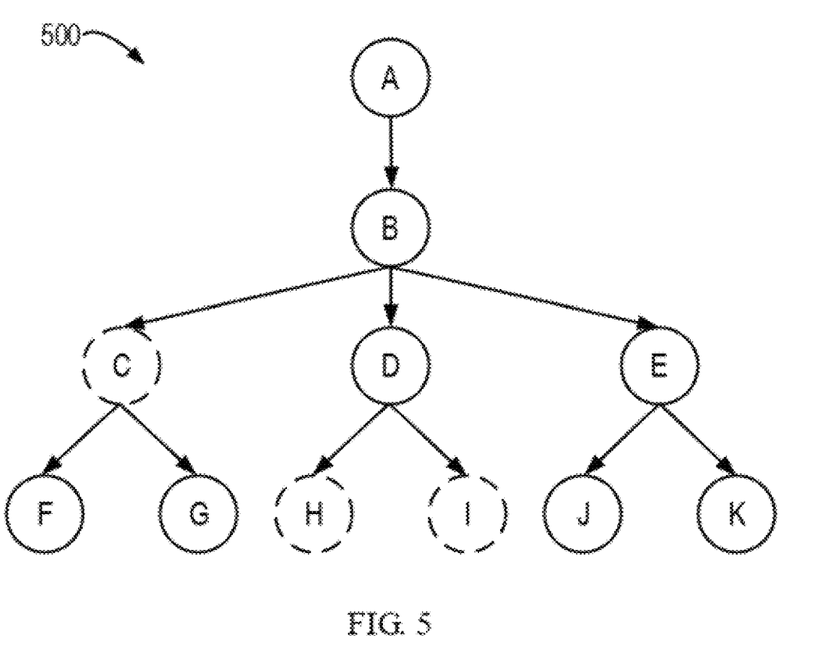
FIGS. 5-7 illustrate schematic diagrams of a graph for an algorithm in accordance with embodiments of the present disclosure, respectively.

Description will be made with reference to the example of FIG. 5. FIG. 5 is a schematic diagram of an error information graph according to blocks 416-418 shown in FIG. 4. In this specific implementation, a single root node A exists, and three nodes C, H and I currently containing contagious errors are shown with sparse dashed lines. The plurality of paths from the root node to the three nodes obtained at block 416 are: A→B→C, A→B→D→H and A→B→D→I, respectively. The set of truncated paths generated at block 418 may include three truncated paths: A→B (corresponding to the node C), A→B→D (corresponding to the node H) and A→B→D (corresponding to the node I).

Returning to FIG. 4, at step 420, a plurality of truncated paths are compared.

Such comparison is based on the following determination criterion: All the nodes containing error information may be classified into groups, so that for each group, the LCA of the group satisfies at least one of the following criteria:

(i). nodes containing contagious errors, the distance of these nodes from their shared LCA is one hop. The criterion is made because if the distance between the LCA and the node containing contagious error is greater than one hop, then it is impossible to obtain the accurate state of the intermediate node between the LCA and the node containing contagious error, and thus, it is impossible to determine whether these intermediate nodes would have any effect on contagious errors of underlying nodes. To avoid such uncertainty and simplify the algorithm, only LCA distanced one hop from the node containing contagious error may be selected and identified.

(ii). The group only has one node and the LCA is the node per se. Under this condition, the node is also referred to as "self-contained" LCA.

Based on the above criteria, it is possible to classify each path in the set of truncated paths. For example, the truncated path having non-uniqueness in the set of truncated paths (namely, the set has identical truncated paths) corresponds to the above scenario (i). It shall be understood easily that the last common node of these identical truncated paths is an LCA. In another case, the truncated path having uniqueness in the set of truncated paths (namely, the set only has a single truncated path) corresponds to the above scenario (ii). It shall be appreciated easily that for a truncated path having uniqueness, the last node of the complete path before it is truncated is a "self-contained" LCA.

In the example shown in FIG. 5, it is three paths A→B, A→B→D and A→B→D contained the list of truncated paths that are compared. Obviously, for the same paths A→B→D, the LCA node D is identified. For a single path A→B, it is recovered as a complete path before truncation (namely, A→B→C) and the node C is identified as LCA ("self-contained" LCA).

Continuing to refer to FIG. 4, since the node identified as "self-contained" LCA is located on a single path, and there are no other nodes sharing LCA therewith, this "self-contained" LCA node may be problematic itself. Therefore, at block 424, this kind of "self-contained" LCA nodes is directly identified as a third type of error source and output to the user.

The LCA node identified in the above scenario (i) may be identified directly as a fourth type of error source and output to the user. In a preferred embodiment, it is also possible to continue to screen the plurality of LCA nodes obtained through the above operation. In the preferred embodiment, the plurality of LCA nodes obtained through the first round of screening are identified as fourth type of error source candidates.

Next, the fourth type of error source candidates continue to be screened. At block 426, the processing of comparing the distance between two fourth type of error source candidates is performed. If the two LCAs identified currently are distanced one hop, then in the two LCAs, it is very likely that the LCA node per se closer to the root has contagious error, and the error influences nodes following the node, thereby a determination of whether the distance between two fourth type of error source candidates is within one hop is made at block 428. If yes, then at block 432, the two LCAs may be "merged" and only the LCA closer to the root node is retained and the LCA farther from the root node is removed.

Figure 6:
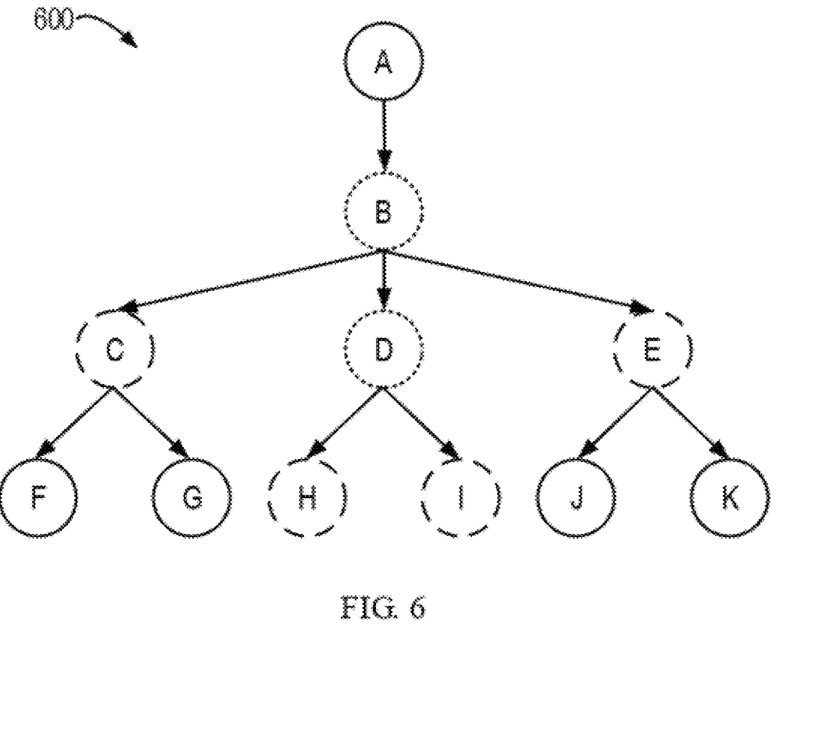

FIG. 6 is a schematic diagraph illustrating an error information graph for the flow from blocks 426 to 428 and branch 432 in FIG. 4. With reference to FIG. 6, it may be known that the nodes currently containing contagious error are C, H, I and E (indicated by sparse dashed lines in FIG. 6). Based on the previous algorithm, nodes B and D are identified as LCA in the first round of processing (indicated by dense dashed lines in FIG. 6). Since the distance between the two LCAs is exactly one hop, it may be considered that the error generated by node D is very likely to be affected by the error of node B closer to the root. Therefore, these two LCAs are "merged," and only the LCA node B is retained.

For the other case, namely, at block 430, if the distance between two LCA nodes is greater than one hop, then the two LCAs are generally considered as separate LCAs and both retained. That is, in this case, it is considered that the errors of the two LCAs are generated independently and do not influence each other.

Figure 7:
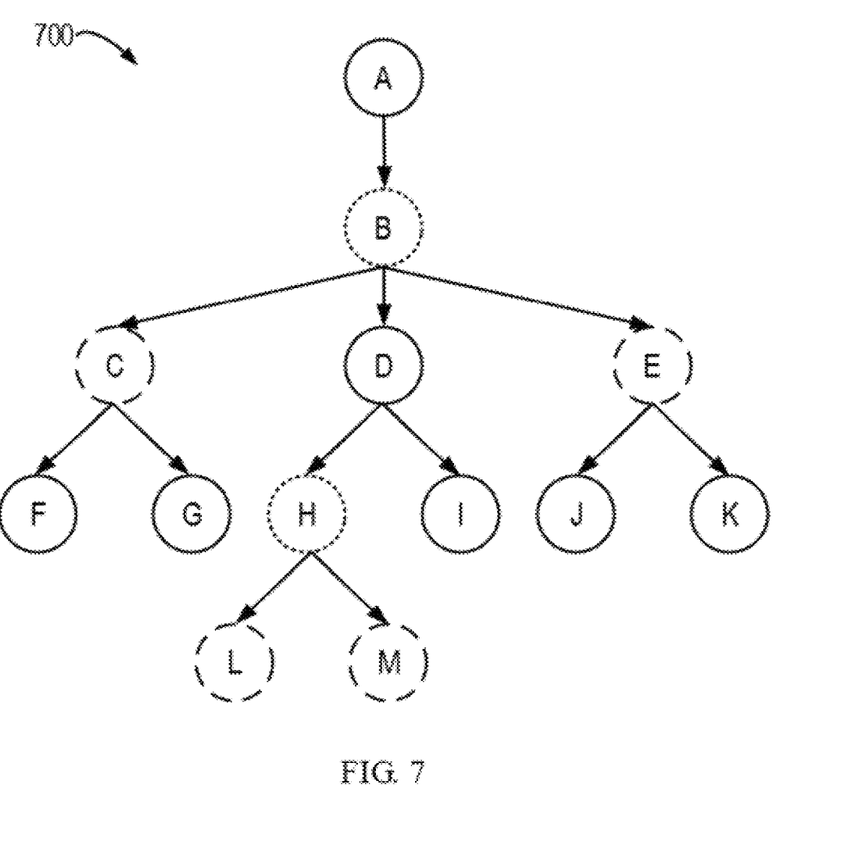

FIG. 7 is a schematic diagram illustrating an error information graph for the flow from blocks 426 to 428 and branch 430 in FIG. 4. Referring to FIG. 7, it may be known that the nodes currently containing contagious error are C, E, L and M (indicated by sparse dashed lines in FIG. 7). Based on the previous algorithm, nodes B and H are identified as LCA in the first round of processing (indicated by dense dashed lines in FIG. 7). Since the distance between the two LCAs exceeds one hop, it may be considered that the errors of nodes B and H are very likely to be generated independently. Therefore, these two LCAs are both retained.

Continuing to refer to FIG. 4, at block 434, the fourth type of error source candidates obtained in the foregoing steps through merging processing are identified as fourth type of error sources and output to the user.

Based on the above processing, different types of error sources in the components of the storage system are identified as problematic components and displayed to the system maintenance staff who, after obtaining the information of identified problematic components, can locate errors in the storage system quickly and accurately.

Additionally or optionally, the method 400 may further include a block 436. At block 436, additional components associated with identified problematic components are determined. Such additional components are not included in the topology structure of the storage system so that the generated structure graph or error information graph does not contain nodes corresponding to the additional components. However, for system maintenance staff, such information of additional components is helpful for looking up error source in the storage system. By considering the real hardware structure information under actual operation conditions, valuable additional information for identifying the error source may be provided to the user.

For example, components corresponding to several LCA nodes at the same level may be mutually dependent in a real hardware structure, and they may be commonly connected to another additional component (such as a backplane). However, it is possible that the additional component is not included in the structure graph of the system constructed at the beginning. In the real operation, compared with checking the several failed LCA nodes respectively, a more reasonable and operable option for the maintenance staff might be to check and/or substitute the additional component that they are commonly connected to, because a more likely error source should be the additional component that they are commonly connected to.

To solve the problem in this scenario, it is possible to configure a "virtual" node associated with the above particular additional component in the generated structure graph or error information graph. This virtual node does not participate in the process of identifying the LCA and is only used to identify the mutual relation between the particular additional component and the remaining components existing in the graph. It shall be understood easily that if all the child nodes of a "virtual" node appear in the finally output error source, it may be considered that the additional component is a more likely error source so that the additional component corresponding to the "virtual" node is determined to be an error source component that should be processed with higher priority than the component that its child node corresponds to and output to the user.

Figure 8:
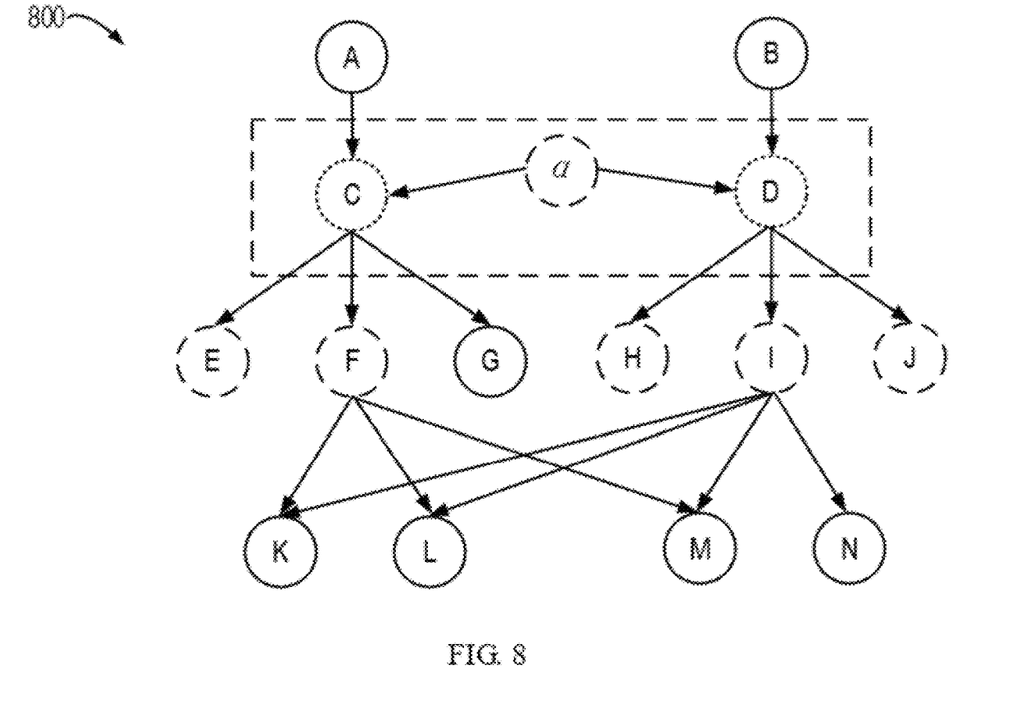
FIG. 8 illustrates a schematic diagram of a graph for utilizing information of additional components in accordance with embodiments of the present disclosure.

Reference will be made to FIG. 8 to depict block 436 in FIG. 4. FIG. 8 is a schematic diagram illustrating an error information graph utilizing information of an additional component in accordance with embodiments of the present disclosure. In FIG. 8, when a structure graph or error information graph is constructed, a virtual node a is allocated to an expander backplane on which expanders C and D coexist. If after processing based on the foregoing algorithm, it is finally determined that C and D are both error sources, then the backplane corresponding to the virtual node a is an error source that should be processed with higher priority and output as additional information to the user and recommended to the user preferentially.

Based on the above depiction, it is clear that compared with the past time-consuming and error-prone process, the present disclosure provides a new scheme for identifying problematic components in the storage system. The scheme, through effective means, such as analyzing the graph associated with the topology structure of the storage system, applying the LCA algorithm, and considering the influence of the additional components, can identify error sources more intelligently, accurately and effectively and reduce operation costs effectively, improve working efficiency and enhance user's using experience.

Figure 9:
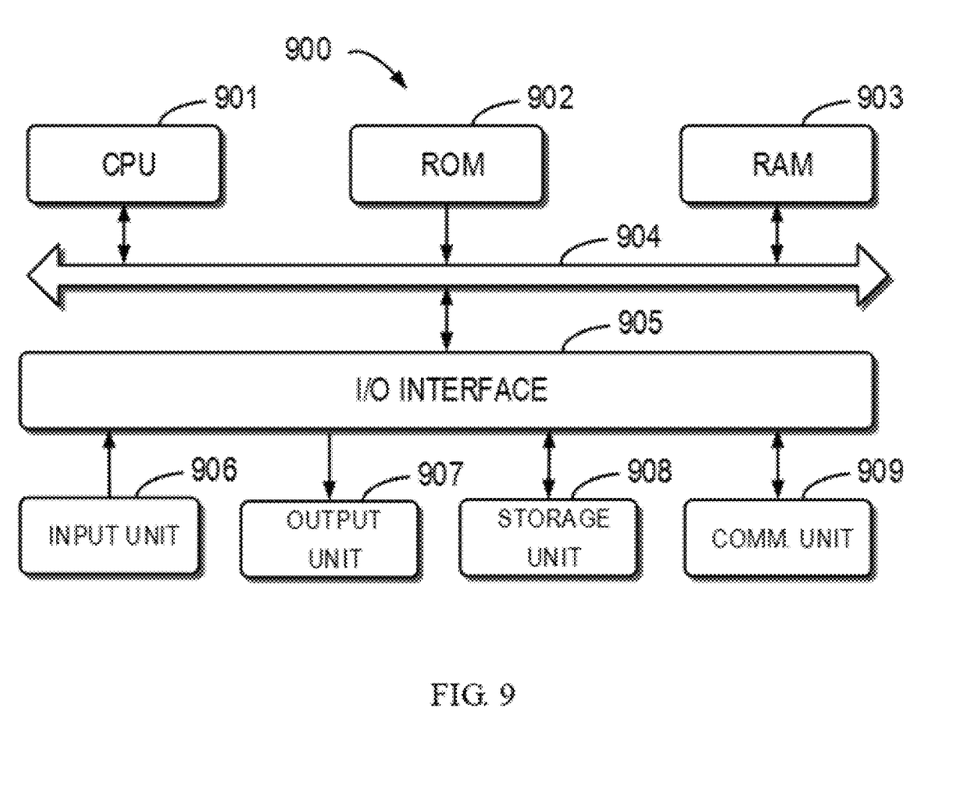
FIG. 9 illustrates a schematic block diagram of an example device that may be used to implement embodiments of the present disclosure.

FIG. 9 illustrates a schematic diagram of an example device 900 for implementing embodiments of the present disclosure. As shown, the device 900 includes a central process unit (CPU) 901, which can perform various suitable actions and processing based on the computer program instructions stored in the read-only memory (ROM) 902 or the computer program instructions loaded into the random-access memory (RAM) 903 from the storage unit 908. The RAM 903 can also store various programs and data required for the operation of the device 900. The CPU 901, the ROM 902 and the RAM 903 are connected to each other via a bus 904. An input/output (I/O) interface 905 is also connected to the bus 904.

A plurality of components in the device 900 are connected to the I/O interface 905, including: an input unit 906, such as a keyboard, a mouse and the like; an output unit 907, such as various kinds of displays and loudspeakers and the like; the storage unit 908, such as a magnetic disk and an optical disk and the like; and a communication unit 909, such as a network card, a modem, a wireless transceiver and the like. The communication unit 909 allows the device 900 to exchange information/data with other devices via the computer network, such as the Internet, and/or various telecommunication networks.

The above described procedures and processing, such as the method 200 or 400, can also be performed by the processing unit 901. For example, in some embodiments, the method 200 can be implemented as a computer software program tangibly included in the machine-readable medium, for example, the storage unit 908. In some embodiments, the computer program can be partially or fully loaded and/or mounted to the device 900 via the ROM 902 and/or the communication unit 909. When the computer program is loaded onto RAM 903 and executed by the CPU 901, one or more actions of the above described method 200 or 400 can be implemented. Alternatively, the CPU 901 may also be configured to implement the above described method 200 or 400 in any other proper manner (such as by means of firmware).

The present disclosure can be a method, apparatus, system and/or computer program product. The computer program product can include a computer-readable storage medium, on which the computer-readable program instructions for performing various aspects of the present disclosure are loaded.

The computer-readable storage medium can be a tangible apparatus that maintains and stores instructions utilized by the instruction executing apparatus. The computer-readable storage medium can be, but not limited to, such as an electrical storage device, a magnetic storage device, an optical storage device, an electromagnetic storage device, a semiconductor storage device or any appropriate combinations of the above. More detailed examples (non-exhaustive list) of the computer-readable storage medium include: a portable computer disk, a hard disk, a random-access memory (RAM), a read-only memory (ROM), an erasable programmable read-only memory (EPROM or flash memory), a static random-access memory (SRAM), a portable compact disk read-only memory (CD-ROM), a digital versatile disk (DVD), a memory stick, a floppy disk, a mechanical coding device, a punched card having stored instructions thereon, or raised structures in a groove, and any appropriate combinations of the above. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical fibers transmission, wireless transmission, routers, firewalls, switches, gateway computers and/or edge servers. A network adapter card or network interface in each computing/processing device receives computer readable program instructions from the network, and forwards the computer readable program instructions for storage in a computer readable storage medium within the respective computing/processing device.

Computer program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the case relating to the remote computer, the remote computer may be connected to the user's computer through any type of network, including a local area network (LAN) or a wide area network (WAN), or may be connected to an external computer (for example, through the Internet using an Internet Service Provider). In some embodiments, electronic circuitry, for example, programmable logic circuitry, field-programmable gate arrays (FPGA), or programmable logic arrays (PLA), which may execute computer readable program instructions, may be customized by utilizing the state information of the computer readable program instructions, in order to perform aspects of the present disclosure.

Aspects of the present disclosure are described herein with reference to flowchart illustrations and/or block diagrams of methods, apparatus (systems), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions may be provided to a processing unit of a general purpose computer, special purpose computer, or other programmable data processing apparatus to produce a machine, such that the instructions, being executed by the processing unit of the computer or other programmable data processing apparatus, create an apparatus for implementing the functions/acts specified in the flowchart and/or block diagram block or blocks. These computer readable program instructions may also be stored in a computer readable storage medium, and direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable data processing apparatus or other device to produce a computer implemented process, such that the instructions, being executed on the computer, other programmable apparatus, or other device, implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, code segment, or portion of code, which comprises one or more executable instructions for implementing the specified logical function(s). In some alternative implementations, the functions noted in the block may occur in an order different from that noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for the purpose of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or the technical improvement over technologies found in the marketplace, or to enable others of ordinary skilled in the art to understand the embodiments disclosed herein.

We claim:

1. A method for identifying a problematic component in a storage system, comprising:
   determining, based on history error logs of components of the storage system, a graph indicating error information of the components, nodes in the graph indicating the components, and edges in the graph indicating connections between the components, wherein the error information of the components from the history error logs is filtered with a predetermined time segment, such that only error logs associated with a latest state of the storage system are retained, and wherein the error information comprises at least one of:
   a non-contagious error,
   a contagious error related to a topology structure, and
   a contagious error unrelated to the topology structure; and
   identifying, based on the graph, an error source in the components of the storage system to be the problematic component, wherein identifying the error source in the components of the storage system comprises:
   determining, from the graph, the error information of the components; and
   determining the error source in the components of the graph based on the error information.

2. The method according to claim 1, wherein determining the graph indicating the error information of the components comprises:
   determining, from an original log of the storage system, a topology structure and the history error logs of the components of the storage system;
   constructing a structure graph of the storage system based on the topology structure; and
   applying the history error logs to the structure graph to obtain the graph indicating the error information of the components.

3. The method according to claim 1, wherein determining the graph indicating the error information of the components comprises:

determining whether a topology error exists in the graph; and in response to determining that the topology error exists, updating the graph based on a topology template, the topology template being obtained based on priori knowledge about a topology structure of the storage system.

4. The method according to claim 1, wherein determining the error source of the components in the graph further comprises:

in response to determining that a component has a contagious error related to a topology structure, identifying the component to be a first type of error source.

5. The method according to claim 1, wherein determining the error source of the components in the graph further comprises:

in response to determining that a component only has a non-contagious error, identifying the component to be a second type of error source.

6. The method according to claim 1, wherein determining the error source of the components in the graph further comprises:

obtaining a plurality of paths from a root node to a node, in the graph, corresponding to a component having a contagious error unrelated to a topology structure;

generating a set of truncated paths based on the plurality of paths;

determining a third type of error source based on a truncated path of uniqueness in the set of truncated paths; and determining a fourth type of error source based on a truncated path of non-uniqueness in the set of truncated paths.

7. The method according to claim 1, further comprising:

determining a further component associated with the problematic component, the additional component being excluded from the graph; and providing information about the further component to a user.

8. A device for identifying a problematic component in a storage system, comprising:

at least one processing unit;

at least one memory coupled to the at least one processing unit and storing instructions executed by the at least one processing unit, the instructions, when executed by the at least one processing unit, causing the device to perform acts comprising:

determining, based on history error logs of components of the storage system, a graph indicating error information of the components, nodes in the graph indicating the components, and edges in the graph indicating connections between the components, wherein the error information of the components from the history error logs is filtered with a predetermined time segment, such that only error logs associated with a latest state of the storage system are retained, and wherein the error information comprises at least one of:

a non-contagious error, a contagious error related to a topology structure, and a contagious error unrelated to the topology structure; and identifying, based on the graph, an error source in the components of the storage system to be the problematic component, wherein identifying the error source in the components of the storage system comprises:

determining, from the graph, the error information of the components; and determining the error source in the components of the graph based on the error information.

9. The device according to claim 8, wherein determining the graph indicating the error information of the components comprises:

determining, from an original log of the storage system, a topology structure and the history error logs of the components of the storage system;

constructing a structure graph of the storage system based on the topology structure; and applying the history error logs to the structure graph to obtain the graph indicating the error information of the components.

10. The device according to claim 8, wherein determining the graph indicating the error information of the components comprises:

determining whether a topology error exists in the graph; and in response to determining that the topology error exists, updating the graph based on a topology template, the topology template being obtained based on priori knowledge about a topology structure of the storage system.

11. The device according to claim 8, wherein determining the error source of the components in the graph further comprises:

in response to determining that a component has a contagious error related to a topology structure, identifying the component to be a first type of error source.

12. The device according to claim 8, wherein determining the error source of the components in the graph further comprises:

in response to determining that a component only has a non-contagious error, identifying the component to be a second type of error source.

13. The device according to claim 8, wherein determining the error source of the components in the graph further comprises:

obtaining a plurality of paths from a root node to a node, in the graph, corresponding to a component having a contagious error unrelated to a topology structure; and generating a set of truncated paths based on the plurality of paths;

determining a third type of error source based on a truncated path of uniqueness in the set of truncated paths; and determining a fourth type of error source based on a truncated path of non-uniqueness in the set of truncated paths.

14. The device according to claim 8, wherein the acts further comprise:

determining a further component associated with the problematic component, the additional component being excluded from the graph; and providing information about the further component to a user.

15. A computer program product for identifying a problematic component in a storage system, the computer program product comprising:

a non-transient computer readable medium encoded with computer-executable code, the code configured to enable the execution of:

determining, based on history error logs of components of the storage system, a graph indicating error information of the components, nodes in the graph indicating the components, and edges in the graph indicating connections between the components, wherein the error information of the components from the history error logs is filtered with a predetermined time segment, such that only error logs associated with a latest state of the storage system are retained, and wherein the error information comprises at least one of:

a non-contagious error, a contagious error related to a topology structure, and a contagious error unrelated to the topology structure; and identifying, based on the graph, an error source in the components of the storage system to be the problematic component, wherein identifying the error source in the components of the storage system comprises:

determining, from the graph, the error information of the components; and determining the error source in the components of the graph based on the error information.

16. The computer program product of claim 15, wherein determining the graph indicating the error information of the components comprises:

determining, from an original log of the storage system, a topology structure and the history error logs of the components of the storage system;

constructing a structure graph of the storage system based on the topology structure; and applying the history error logs to the structure graph to obtain the graph indicating the error information of the components.

* * * * *